(12) United States Patent
Klein et al.

(10) Patent No.: US 6,837,367 B1
(45) Date of Patent: Jan. 4, 2005

(54) MODULAR PLASTIC CONVEYOR BELT WITH HIGH BEAM STRENGTH

(75) Inventors: Richard M. Klein, Slidell, LA (US); Lynell M. Duhon, New Orleans, LA (US); Errol P. Knott, Gonzales, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/605,902

(22) Filed: Nov. 5, 2003

(51) Int. Cl.⁷ ............................................. B65G 17/06
(52) U.S. Cl. ..................................... 198/853; 198/852
(58) Field of Search ................................. 198/852, 853

(56) References Cited

U.S. PATENT DOCUMENTS

| | | | |
|---|---|---|---|
| 4,742,907 A | 5/1988 | Palmaer | 198/831 |
| 4,901,844 A | 2/1990 | Palmaer et al. | 198/778 |
| 4,972,942 A | 11/1990 | Faulkner | 198/853 |
| 5,070,999 A | 12/1991 | Layne et al. | 198/778 |
| 5,133,449 A | 7/1992 | Spangler | 198/778 |
| 5,139,135 A | 8/1992 | Irwin et al. | 198/853 |
| 5,174,439 A * | 12/1992 | Spangler et al. | 198/853 |
| 5,224,587 A | 7/1993 | Robertson | 198/831 |
| 5,310,045 A | 5/1994 | Palmaer et al. | 198/778 |
| 5,318,169 A | 6/1994 | Faulkner et al. | 198/778 |
| 5,346,059 A * | 9/1994 | Irwin | 198/852 |
| 5,358,096 A | 10/1994 | Faulkner et al. | 198/778 |
| 5,372,248 A | 12/1994 | Horton | 198/852 |
| 5,431,275 A | 7/1995 | Faulkner | 198/853 |
| 5,467,865 A | 11/1995 | Irwin | 198/778 |
| 5,547,071 A | 8/1996 | Palmaer et al. | 198/853 |
| 5,738,205 A | 4/1998 | Draebel | 198/852 |
| 5,775,480 A * | 7/1998 | Lapeyre et al. | 198/831 |
| 5,921,379 A | 7/1999 | Horton | 198/852 |
| 6,006,898 A | 12/1999 | Odink | 198/853 |
| 6,041,917 A | 3/2000 | Layne | 198/853 |
| 6,073,756 A | 6/2000 | Damkjaer et al. | 198/853 |
| 6,484,379 B2 | 11/2002 | Palmaer | 29/401.1 |
| 2001/0050214 A1 | 12/2001 | Guldenfels | 198/853 |

FOREIGN PATENT DOCUMENTS

| | | |
|---|---|---|
| WO | WO-99/50160 A1 | 10/1999 |
| WO | WO-99/65801 A1 | 12/1999 |

OTHER PUBLICATIONS

KVP, KVP Engineering Guidelines, date unknown, pp. 9–4 through 9–5, KVP, Rancho Cordova, California, USA.
Intralox, Intralox Belt Selection Guide, Jan. 2003, copyright Intralox, Inc. 2002, Harahan, Louisiana, USA.

* cited by examiner

Primary Examiner—Eileen D. Lillis
Assistant Examiner—Mark A. Deuble
(74) Attorney, Agent, or Firm—James T. Cronvich

(57) ABSTRACT

A modular plastic conveyor belt having a central beam along each belt row. The beam extends laterally across the width of a belt row and includes a linear portion in a middle region of the belt and a sinuous region near both side edges of the belt. In the linear region, the beam includes a portion of constant thickness with linearly tapering portions toward the side edges of the belt. In this way, the thicker portions of the beam in the middle of the belt provide beam strength to allow less frequent support beneath the belt and the thinner sinuous portions at the edges of the belt give it the flexibility and mobility to collapse at the inside of a turn.

27 Claims, 5 Drawing Sheets

MODULAR PLASTIC CONVEYOR BELT WITH HIGH BEAM STRENGTH

BACKGROUND OF INVENTION

The invention relates generally to power-driven conveyors and, more particularly, to modular plastic conveyor belts suitable for following curved paths.

Many conveying applications require conveyor belts to transport articles along curved paths. In low-tension spiral conveyors, for example, a conveyor belt is wrapped helically around a cylindrical drive tower in a compact arrangement for use inside a freezer or on a cooling line. Conventionally, metal conveyor belts have been used with spiral conveyors. But, as metal belts wear, black specks or worn-off bits of metal fall on the conveyed articles. In many food applications, black specks are not acceptable. In response to the black-speck problem and other food-contamination problems, modular plastic conveyor belts have begun replacing metal belts in food applications. In an ideal situation, a modular plastic belt is a drop-in replacement for a metal belt once the take-up, tensioning, and other sprockets are replaced. But, because metal belts have inherent beam strength, they are often supported from below only intermittently across their width, such as at their side edges and middle. This minimal support structure also allows for good airflow. Plastic belts with a lot of open area for air flow and for the collapsibility required to negotiate turns, however, do not normally have much beam strength. This lack of beam strength causes conventional plastic conveyor belts to sag between the spaced apart supports. In a tightly stacked spiral system, the belt sag can interfere with supporting conveyor structure. Consequently, there is a need for a conveyor belt with increased beam strength for wide belt constructions that is capable of following curved conveying paths and that does not produce black specks that can contaminate conveyed products.

SUMMARY OF INVENTION

These needs and others are satisfied by a modular plastic conveyor belt embodying features of the invention. The belt comprises a series of rows of belt modules. Each row extends laterally in width from a first side edge to a second side edge, longitudinally in the direction of belt travel from a leading end to a trailing end, and in depth from a top side to a bottom side. Each row includes at least one belt module. A central beam is formed in each belt module with a leading wall and an opposite trailing wall defining a beam thickness. The beam is arranged laterally across the width of the row. Laterally spaced leading hinge members extend generally longitudinally from the leading wall. Laterally aligned holes are formed through the leading hinge members. Similarly, laterally spaced trailing hinge members extend generally longitudinally from the trailing wall and form laterally aligned holes. The thickness of the central beam is greater at the middle of the row than at the first and second side edges. Hinge pins extend through lateral passageways formed by the aligned holes of interleaved leading and trailing hinge members of consecutive rows. Thus, the hinge pins interconnect the rows into an endless conveyor belt.

In another aspect of the invention, a conveyor belt comprises a series of rows of belt modules. Each row extends laterally from a first side edge to a second side edge and longitudinally in the direction of belt travel from a leading end to a trailing end. Each row includes at least one belt module. A central beam, formed in each belt module, is arranged laterally across the width of the row. The beam's thickness is measured generally in the direction of belt travel. Laterally spaced leading hinge members extend generally longitudinally from the central beam toward the leading end of the row. Laterally spaced trailing hinge members extend generally longitudinally from the central beam toward the trailing end. The leading hinge members have laterally aligned holes, and the trailing hinge members have laterally aligned holes. The central beam includes sinuous portions near the first and second side edges of the row and a linear portion in a middle region of the row. The leading and trailing hinge members of adjacent rows are interleaved. Hinge pins extend through lateral passageways formed by the aligned holes of interleaved hinge members to interconnect the rows into an endless conveyor belt.

In yet another aspect of the invention, a modular plastic conveyor belt comprises a series of rows of belt modules. Each row extends laterally from a first side edge to a second side edge and longitudinally from a first end to a second end. Each row includes at least one belt module. A central beam, formed in each belt module, is arranged laterally across the width of the row. The beam thickness is defined generally in the direction of belt travel. A first plurality of laterally spaced hinge members extends generally longitudinally from the central beam toward the first end of the row. A second plurality of laterally spaced hinge members extends generally longitudinally from the central beam toward the second end. Laterally aligned holes are formed in the first plurality of hinge members. Laterally aligned holes formed in the second plurality of hinge members are elongated longitudinally. Indexing means prevents adjacent rows from moving laterally relative to each other. Hinge pins extend through lateral passageways formed by the aligned holes through interleaved first and second hinge members of consecutive rows to interconnect the rows into an endless conveyor belt.

BRIEF DESCRIPTION OF DRAWINGS

These and other features, aspects, and advantages of the invention are better understood by reference to the following description, appended claims, and accompanying drawings, in which:

DETAILED DESCRIPTION

Figure 1:
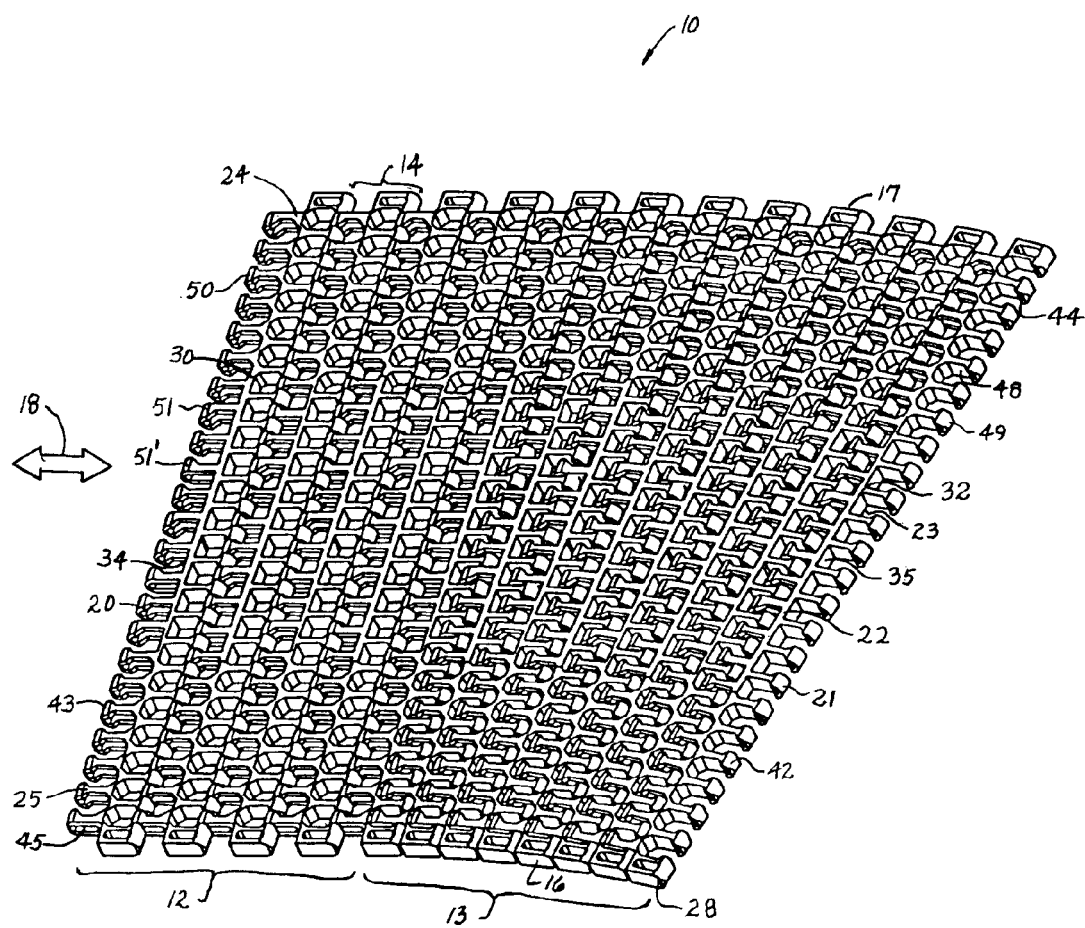
FIG. 1 is an isometric view of a portion of a modular plastic conveyor belt embodying features of the invention on both straight and curving conveyor paths.
Figure 2:
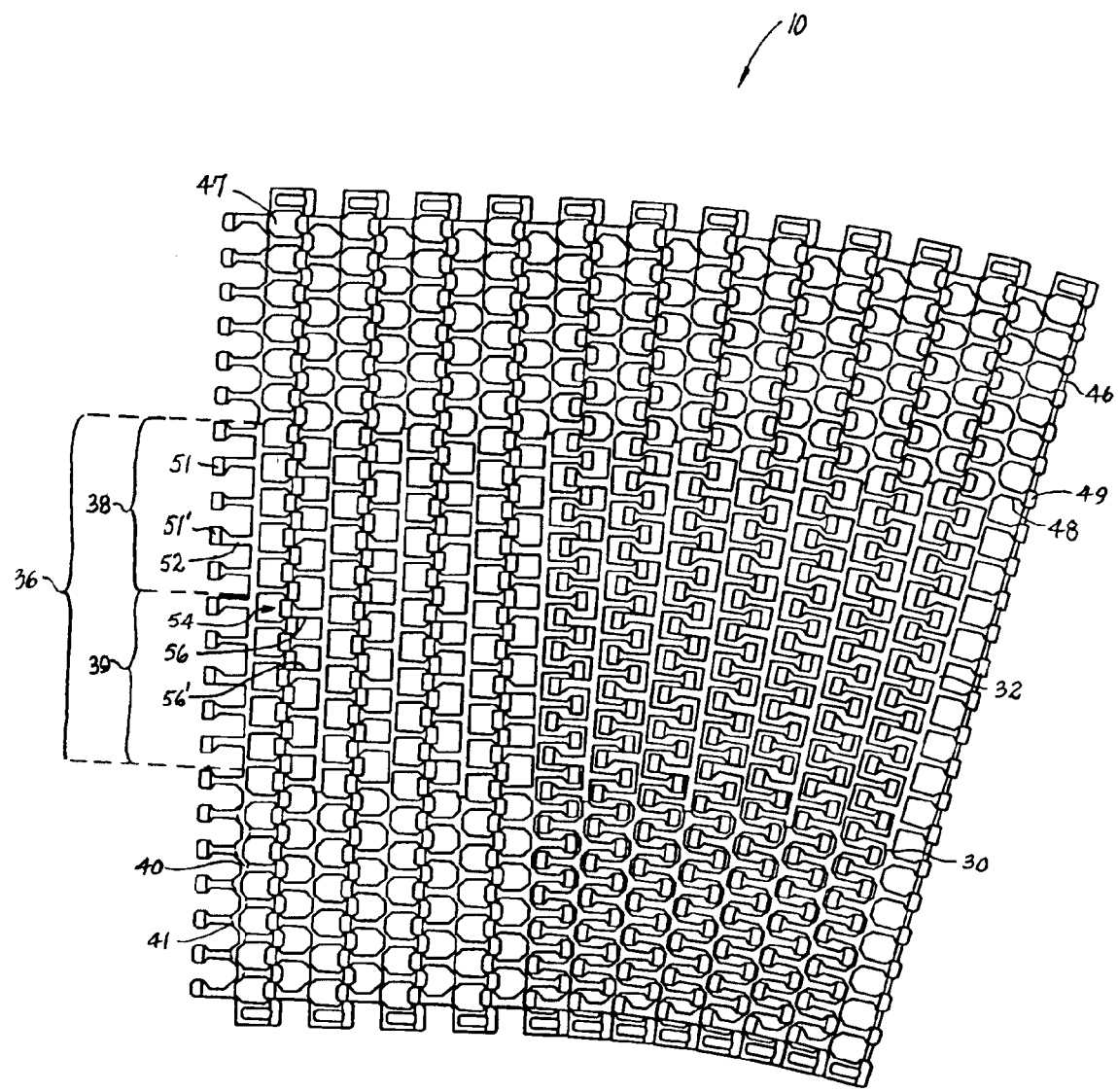
FIG. 2 is a plan view of the conveyor belt of FIG. 1.

A portion of a modular plastic conveyor belt embodying features of the invention is shown in FIGS. 1 and 2. The conveyor belt 10 is shown in FIG. 1 following a conveying path that includes straight 12 and curved 13 segments. The belt consists of a series of rows 14 of belt modules. Each row extends laterally in width from a first side edge 16 to a second side edge 17 and in the direction of belt travel 18, which may be bi-directional, from a leading end 20 to a trailing end 21. The modules extend in depth from a top side 22, on which articles are conveyed, to a bottom side 23. (The descriptors "leading" and "trailing" and "top" and "bottom" are not meant to limit the belt to a certain direction of travel or a certain orientation, but merely to help describe the general spatial relationship of various components of the example versions described.) Each row is made up of a number of belt modules arranged side by side. In this example, a row includes a first side edge module 24 and a second side edge module 25. Although not shown, it would also be possible to have internal modules without side edge structure positioned between the two side edge modules to form a wider belt. Although each row shown in FIG. 1 includes a plurality of side-by-side modules, it is possible to form each row out of a single module that has side edge structure 28 at both edges. Consecutive side edge modules are cut to different widths to construct the belt in a bricklay pattern that avoids continuous seams 30 in consecutive rows. The belt modules are preferably injection molded out of a thermoplastic material, such as polyethylene, polypropylene, acetal, or a composite resin.

A central beam 32, disposed generally midway between the leading and trailing ends, extends laterally across the width of each belt row and in depth from the top side to the bottom side. The beam has a leading vertical wall 34 and a trailing vertical wall 35. The thickness of the beam is measured between the two walls. In a middle region of the belt, the beam is characterized by a linear portion 36 in which the walls are generally straight. The thickness of the beam in its linear portion is measured in the longitudinal direction. The linear portion preferably includes a constant thickness portion 38 and a linearly tapering portion 39 in which the thickness decreases with the distance from the middle of the belt rows. In the relatively narrow belt shown in FIGS. 1 and 2, the linearly tapering portion extends from only one side of the constant thickness portion in each row. The side from which the linearly tapering portion extends alternates from row to row. In a wider belt, the linearly tapering portion preferably extends from both sides of the constant thickness portion toward both side edges of the belt. Of course, it would be possible to construct narrow or wide belts with linearly tapering portions extending from one or both sides of a constant thickness portion or even without a constant thickness region in the middle of the belt. In all these variations, the thick portion of the beam significantly adds to the beam strength of the belt.

Near the side edges of the belt, the central beam assumes a sinuous shape. In this sinuous region, the thickness is measured generally longitudinally, but, more specifically, in a direction normal to the leading and trailing walls. The sinuous portions 40 of the central beam also generally attenuate in thickness monotonically toward the side edges of each row.

Extending longitudinally from the leading and trailing walls of the central beam are leading 42 and trailing 43 sets of hinge members. Although the demarcation between the hinge members and the central beam is not clearly defined, especially in the sinuous portions, the outline of the central beam can be approximated by interpolation as indicated by dashed curved lines 41. Each set of hinge members has laterally aligned holes 44, 45. In this example, the holes 44, 45 through the leading and trailing hinge members are elongated in the direction of belt travel to allow the belt to collapse at the inside of a turn. The trailing holes 45 are elongated farther than the leading holes 44 in this example. (In a straight-running belt, elongated holes are not needed; in a radius, or turning, belt, elongated holes in only one set of hinge members may suffice.) A hinge rod 46 is received in the lateral passageway formed by the aligned holes of the leading hinge members of a row interleaved with the trailing hinge members of the adjacent leading row. Hinge rods connect consecutive rows together at hinge joints. The elongated holes in the hinge members allow the inside edge of the belt to collapse in a turn. The sinuous shape of the central beam at the side edges of the belt deepens the gaps 47 between consecutive hinge, members and allows the hinge members at the inside of a turn to collapse to a greater extent.

In the version of belt shown in FIG. 1, all the hinge members, except for the outermost, in the leading set are identical with a leg 48 that extends from the leading wall of the beam to a laterally wider distal end 49. But the trailing set of hinge members includes, in addition to hinge members 50 similar to those on the leading side, selected hinge members 51, 51' characterized by a thicker leg 52 laterally offset relative to the distal end 49. These selected hinge members are preferably in a middle region of the belt. In the version of FIG. 1, the selected hinge members alternate in position with the other hinge members. The offset directions of the legs 52 relative to the distal ends alternate back and forth throughout the middle region of the belt. As shown in FIG. 2, the thicker leg, one of whose sides is flush with a side of the distal end of the hinge member, fills in a gap 54 between consecutive hinge members and provides a wall 56 that combines with a wall 56' of the next consecutive thick-legged hinge member to serve as indexing means for preventing one row from moving laterally relative to an adjacent row. The gaps filled in by the offset legs leave less room for the distal ends 49 of the interleaved hinge members of the adjacent row to move laterally. In this way, the indexing means reduces lateral play between belt rows, which lessens product orientation problems on an operating belt.

Figure 3:
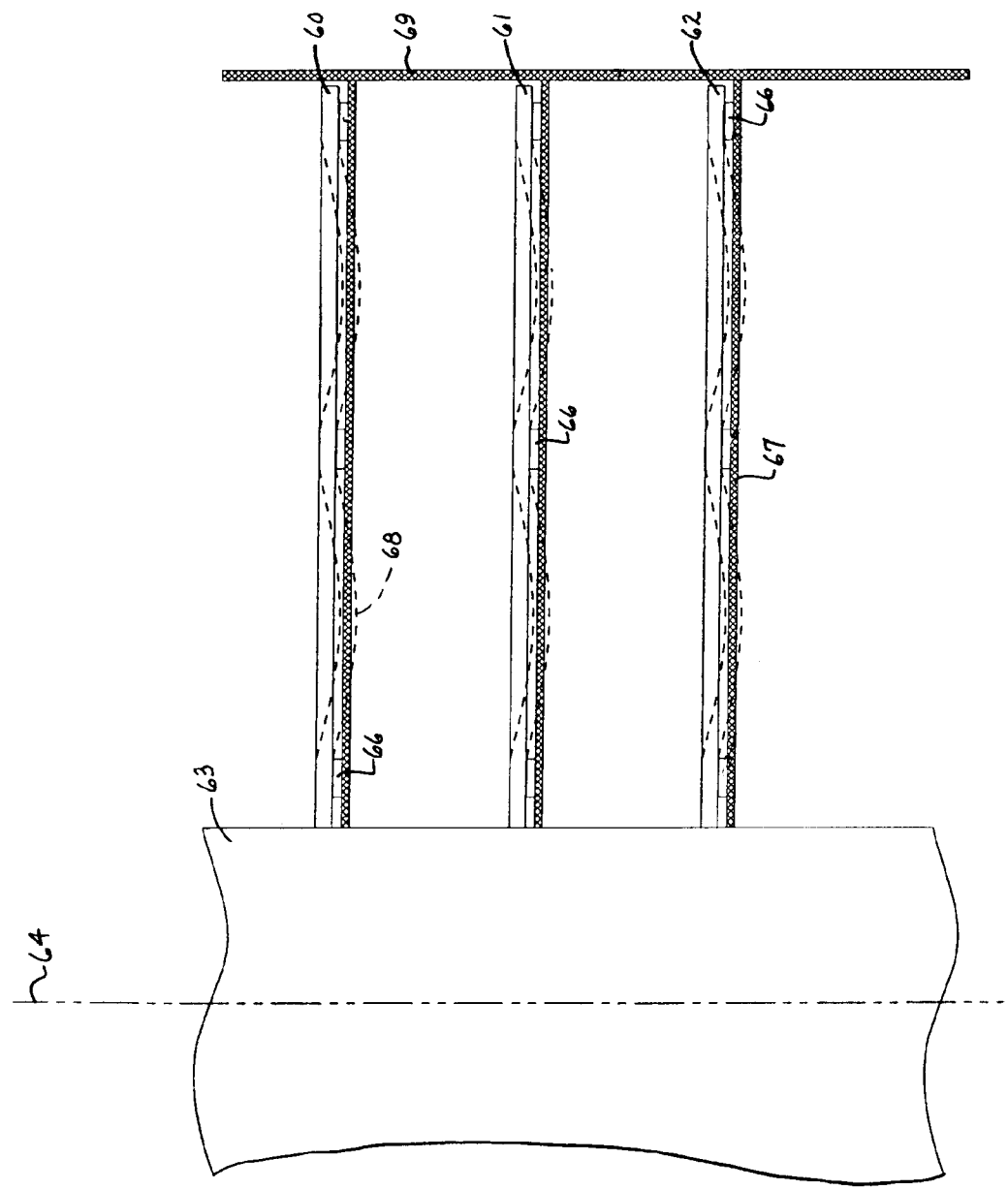
FIG. 3 is an end elevation view in cross section of a conveyor belt as in FIG. 1 in a spiral conveyor.

FIG. 3 shows a conveyor belt as described in a spiral conveyor system. Three layers 60, 61, 62 of a conveyor belt 10 following a helical path around a drive drum 63 rotating about a vertical axis 64 are shown stacked one above the other. Each layer of the belt is supported on wearstrips 66 that are laid out in helical paths around the drum. The wearstrips are, in turn, supported on cantilevered arms 67 extending radially inward at spaced intervals from a cylindrical framework 69 toward the drum. There is a tendency for the belt layers to sag between the supporting wearstrips as indicated by the phantom lines 68. The sagging belt sections can interfere with the cantilevered arms and drag on the frame, which increases tension in the spiral system. The sag also makes it difficult to control product orientation. The sag is even greater for heavier product loads. The more beam strength a belt has, the less it sags between supporting wearstrips. The central beam of the conveyor belt of the invention allows wearstrips to be separated by as much as 0.6 meters, which avoids the time and expense of more closely spaced wearstrips and the associated loss of airflow between layers.

Figure 4:
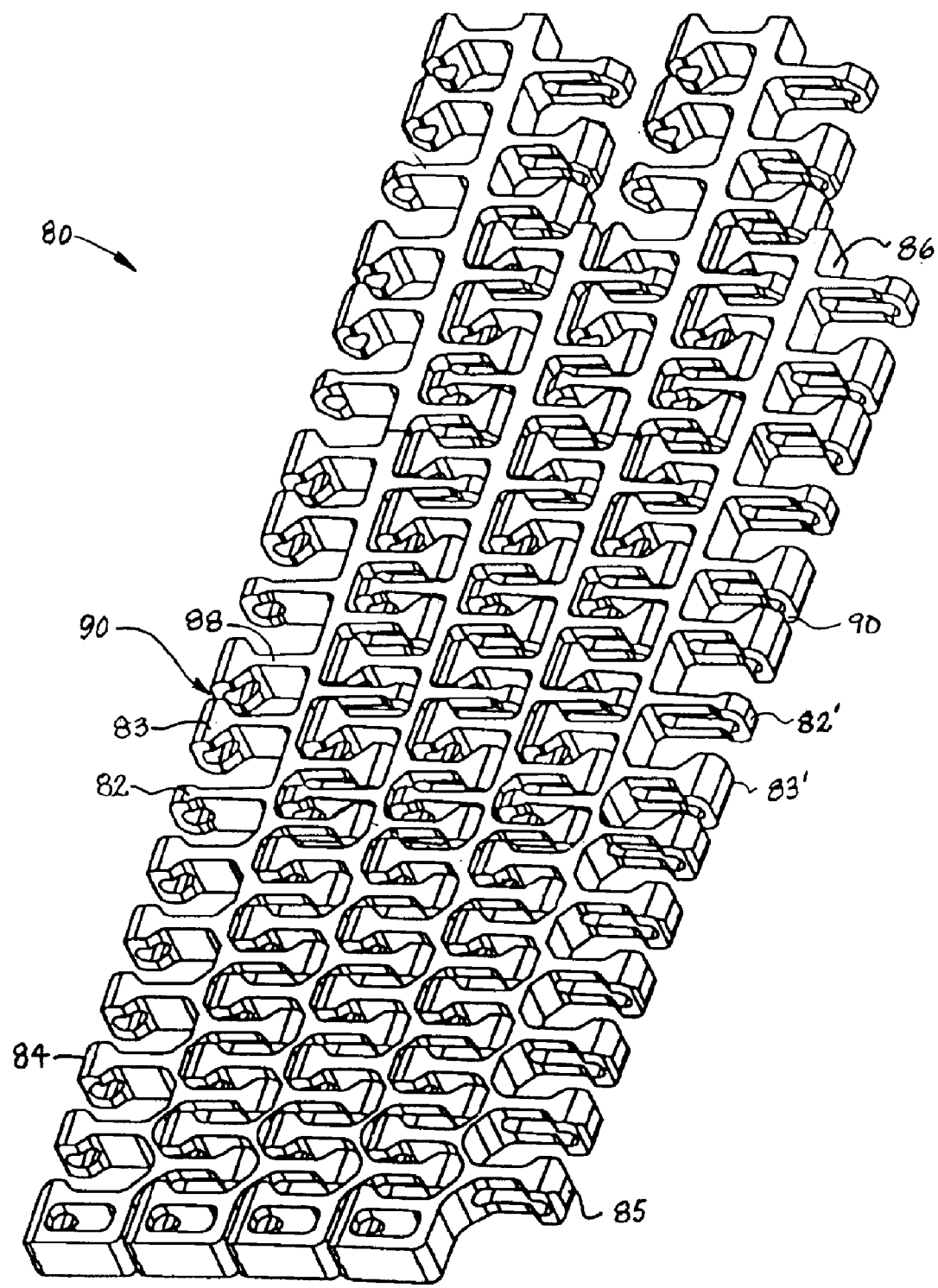
FIG. 4 is an isometric view of a portion of another version of a modular conveyor belt embodying features of the invention and usable in a spiral conveyor as in FIG. 3.

A portion of another version of conveyor belt embodying features of the invention is shown in FIG. 4. This modular plastic conveyor belt 80 is similar to that of FIG. 1. The major differences are in the hinge members, especially as they embody the indexing means. Hinge members in the middle of the belt include narrow-ended hinge members 82 and broad-ended hinge members 83 along a leading end 84 of each row. Hinge members along a trailing end 85 of each row include similar narrow-ended hinge members 82' and broad-ended hinge members 83'. The enlarged distal ends of the hinge members are connected to a central beam 86 by legs 88. The hinge members are assembled with a pair of consecutive broad-ended hinge members 83 forming a narrow gap 90 between the enlarged distal ends. The gap is sized laterally just wide enough to receive the distal end of a narrow-ended hinge member 82' of an adjacent row. The tight clearance across the gap between the broad-ended pair of hinge members and the interleaved narrow-ended hinge member sandwiched between them impedes relative lateral motion between adjacent belt rows.

Figure 5:
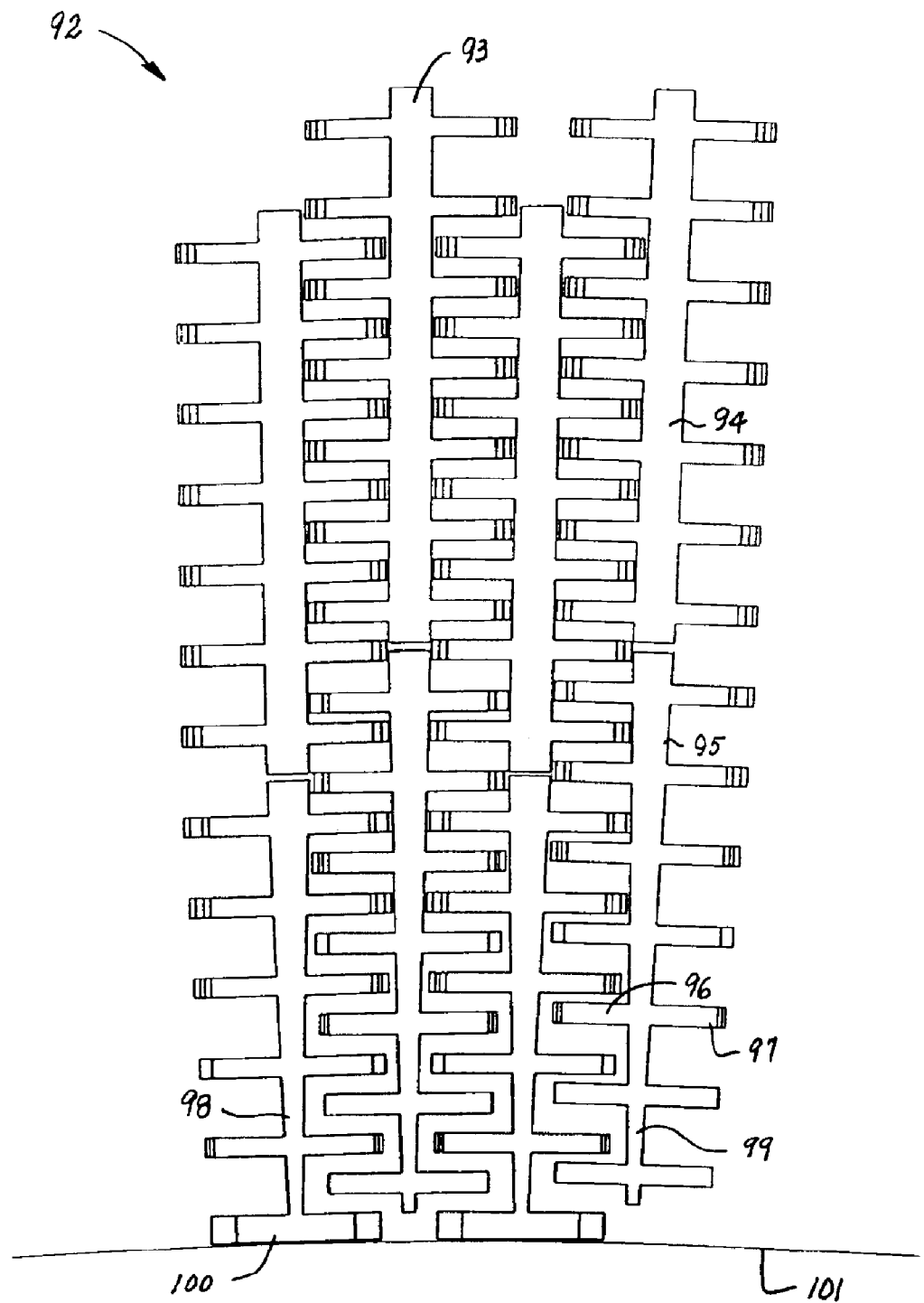
FIG. 5 is a plan view of a portion of another version of modular conveyor belt embodying features of the invention and usable in a spiral conveyor as in FIG. 3.

FIG. 5 shows a portion of yet another conveyor belt suitable for a spiral conveyor as in FIG. 3. Only the side edge of the belt at the inside of a turn is shown. In this version, the belt 92 includes a central beam 93 that has a constant thickness portion 94 at the middle of the row and a linearly tapering portion 95 at the side edge. The linearly tapering portion attenuates in thickness with distance from the middle of the belt row. Leading and trailing hinge members 96, 97 that extend from the central beam are, in this version, aligned with each other and not laterally staggered as in the previously described belt versions. Edge modules 98, 99 of consecutive belt rows differ primarily in that first edge modules 98 terminate at the edge in a flat side edge 100 forming a T with the central beam. The flat side edge contacts the drive surface of the drum of a spiral conveyor 101. The side edges of the adjacent rows are recessed inward of the T-shaped side edges. In a tight turn in which the inside edge of the belt collapses, consecutive T-shaped side edges almost touch each other to give the belt an almost continuous, flat side edge in contact with the surface of the drive drum.

Although the invention has been described in detail with reference to some preferred versions, other versions are possible. For example, a straight-running belt could be built with the indexing and beam strength as described. Consequently, the scope of the claims are not limited to the preferred versions described in detail.

What is claimed is:

1. A modular plastic conveyor belt comprising:
   a series of rows of belt modules, each row extending laterally in width from a first side edge to a second side edge, longitudinally in the direction of belt travel from a leading end to a trailing end, and in depth from a top side to a bottom side, wherein each row includes:
   at least one belt module forming the row;
   a central beam formed in each belt module and arranged laterally across the width of the row, the central beam including a leading wall and an opposite trailing wall defining a beam thickness between the walls;
   a plurality of laterally spaced leading hinge members extending generally longitudinally from the lending wall and forming laterally aligned holes through the leading hinge members;
   a plurality of laterally spaced trailing hinge members extending generally longitudinally from the trailing wall and forming laterally aligned holes through the trailing hinge members;
   wherein the thickness of the central beam is greater at the middle of the row than at the first and second side edges;
   a plurality of hinge pins extending through lateral passageways formed by the aligned holes through interleaved leading and trailing hinge members of consecutive rows to interconnect the rows into an endless conveyor belt.

2. A modular plastic conveyor belt as in claim 1 wherein the central beam includes a first sinuous portion extending inward along the row from the first side edge of the row;
   a second sinuous portion extending inward along the row from the second side edge of the row; and
   a linear portion disposed between the first sinuous portion and the middle of the row and characterized by generally straight leading and trailing walls.

3. A modular plastic conveyor belt as in claim 2 wherein the linear portion includes:
   a constant thickness portion in a middle region of the belt;
   a first tapered portion disposed between the constant thickness portion and the first sinuous portion and characterized by a thickness decreasing toward the first side edge.

4. A modular plastic conveyor bet as in claim 2 wherein the leading and trailing hinge members extending from the linear portion of the central beam each include:
   first hinge members having a laterally narrow end distal from the central beam; and
   second hinge members having a laterally broad end distal from the central beam;
   wherein the second hinge members are arranged successively in pairs separated by a single first hinge member disposed between successive pairs.

5. A modular plastic conveyor belt as in claim 2 wherein the thickness of the central beam in the linear portion decreases monotonically from the middle of the row toward at least one of the first and second side edges of the row.

6. A modular plastic conveyor belt as in claim 1 wherein the central beam extends in depth from the top side to the bottom side of the row.

7. A modular plastic condor belt as in claim 1 wherein each row includes:
   a first edge module at the first side edge of the row characterized by a first edgemost region in which the central beam is sinuous and a second region in which the central beam is linearly tapered in thickness; and
   a second edge module at the second side edge of the row characterized by a first edgemost region in which the central beam is sinuous and a second region in which the central beam is linearly tapered in thickness.

8. A modular plastic conveyor belt as in claim 1 wherein each row includes:
   at least one module at the middle of the row in which the central beam is of constant thickness;
   a first edge module at the first side edge of the row in which the central beam decreases in thickness toward the first side edge; and
   a second edge module at the second side edge of the row in which the central beam decreases in thickness toward the second side edge.

9. A modular plastic conveyor belt comprising:
   a series of rows of belt modules, each row extending laterally in width from a first side edge to a second side edge and longitudinally in the direction of belt travel from a leading end to a trailing end, wherein each row includes:
   at least one belt module forming the row;
   a central beam formed in each belt module and arranged laterally across the width of the row and having a beam thickness generally in the direction of belt travel;
   a plurality of laterally spaced leading hinge members extending generally longitudinally from the central beam toward the leading end and forming laterally aligned holes through the leading hinge members;
   a plurality of laterally spaced trailing hinge members extending generally longitudinally from the central beam toward the trailing end and forming laterally aligned holes through the trailing hinge members;

wherein the central beam includes sinuous portions near the first and second side edges of the row and a linear portion in a middle region of the row;

a plurality of hinge pins extending through lateral passageways formed by the aligned holes through interleaved leading and trailing hinge members of consecutive rows to interconnect the rows into an endless conveyor belt.

10. A conveyor belt as in claim 9 wherein the beam thickness is greater in the linear portion than in the sinuous portions.

11. A conveyor belt as in claim 9 wherein the linear portion includes a portion of constant beam thickness.

12. A conveyor belt as in claim 9 wherein the linear portion includes a tapered portion of linearly decreasing beam thickness.

13. A conveyor belt as in claim 9 wherein the beam thickness in the sinuous portions decreases monotonically toward the nearer side edge of the belt.

14. A conveyor belt as in claim 9 wherein the central beam is disposed generally midway between distal ends of the leading hinge members and of the trailing hinge members.

15. A modular plastic conveyor belt suitable for following a curved conveying path, the conveyor belt comprising:

a series of rows of belt modules, each row extending laterally in width from a first side edge to a second side edge and longitudinally in the direction of belt travel from a first end to a second end wherein each row includes:

at least one belt module forming the row;

a central beam formed in each belt module and arranged laterally across the width of the row and having a beam thickness generally in the direction of belt travel;

a first plurality of laterally spaced hinge members extending generally longitudinally from the central beam toward the first end of the row and forming laterally aligned holes through the first hinge members;

a second plurality of laterally spaced hinge members extending generally longitudinally from the central beam toward the second end of the TOW and forming laterally aligned and longitudinally elongated holes through the second hinge member;

indexing means for prevent adjacent rows from relative lateral motion;

a plurality of hinge pins extending through lateral passageways formed by the aligned holes through interleaved first and second hinge members of consecutive rows to interconnect the rows into an endless conveyor belt, wherein each of the first and second pluralities of hinge members includes leg extending from the central beam to a distal end, wherein the legs of the first and second pluralities of hinge members are narrower than the distal ends.

16. A modular plastic conveyor belt as in claim 15 wherein the central beam includes sinuous portions near the first and second side edges of the row and a linear portion in a middle region of the row.

17. A conveyor belt as in claim 16 wherein the beam thickness is greater in the linear portion than in the sinuous portions.

18. A conveyor belt as in claim 16 wherein the linear portion includes a portion of constant beam thickness.

19. A conveyor belt as in claim 16 wherein the linear portion includes a tapered portion of linearly decreasing beam thickness.

20. A conveyor belt as in claim 16 wherein the beam thickness in the sinuous portions decreases monotonically toward the nearer side edge of the belt.

21. A conveyor belt as in claim 15 wherein the indexing means comprises:

narrow-ended hinge members selected from the first and second pluralities of hinge members and having a laterally narrow end distal from the central beam; and broad-ended hinge members selected from the first and second pluralities of hinge members and having a laterally broad end distal from the central beam;

wherein at least two broad-ended hinge members are arranged successively and separated between their broad distal ends by a narrow gap sized slightly greater than the narrow distal ends of the narrow-ended hinge member.

22. A conveyor belt as in claim 21 wherein the narrow-ended hinge members and the broad-ended hinge members extend from the central beam in a middle tendon of the row between the first and second side edges.

23. A conveyor belt as in clot 21 wherein one of the narrow-ended hinge members along the second end of a row is received in the gap between successive broad-ended hinge members along the first end of an adjacent row.

24. A conveyor belt as in claim 15 wherein the indexing means comprises:

selected hinge members of the first and second pluralities that include a leg including opposite side walls extending longitudinally from the central beam to a distal end that includes opposite side surfaces defining a lateral breadth therebetween that is broader than the leg;

wherein the leg of each of the selected hinge members is offset laterally from the centerline of the distal end.

25. A conveyor belt as in claim 24 wherein one of the side walls of the legs is coplanar with one of the side surfaces of the distal end.

26. A conveyor belt as in claim 24 wherein every other of the hinge members of the second plurality of hinge members in a middle region of the belt rows is a selected hinge member.

27. A conveyor belt as in claim 15 wherein the central beam is disposed generally midway between distal ends of the first plurality of hinge members and of the second plurality of hinge members.

* * * * *

UNITED STATES PATENT AND TRADEMARK OFFICE
CERTIFICATE OF CORRECTION

PATENT NO. : 6,837,367 B1
DATED : January 4, 2005
INVENTOR(S) : Richard M. Klein, Lynell M. Duhon and Errol P. Knott It is certified that error appears in the above-identified patent and that said Letters Patent is hereby corrected as shown below:

<u>Column 5,</u>
Line 66, insert -- : -- after "includes".

<u>Column 7,</u>
Line 44, "TOW" should read -- row --,
Line 56, insert -- a -- between "members includes" and "leg extending".

<u>Column 8,</u>
Line 28, "member" should read -- members --.
Line 31, "tendon" should read -- region --.
Line 33, "clot" should read -- claim --.

Signed and Sealed this

Fifth Day of April, 2005

JON W. DUDAS
*Director of the United States Patent and Trademark Office*